United States Patent [19]

Yeh

[11] Patent Number: 4,685,632
[45] Date of Patent: Aug. 11, 1987

[54] CLICKER-TYPE BRAKE FOR FLY-FISHING REEL

[76] Inventor: Shih-Yuan Yeh, No. 2-4, Chen Hsing Road, Tai Ping Hsiang, Taichung Hsien, Taiwan

[21] Appl. No.: 881,061

[22] Filed: Jul. 1, 1986

[51] Int. Cl.$^4$ ............................................. A01K 89/02
[52] U.S. Cl. ........................... 242/84.51 R; 74/577 S; 188/82.7
[58] Field of Search ............... 242/84.1 R, 84.51 R; 74/577 S, 577 M; 188/82.7, 166

[56] References Cited

U.S. PATENT DOCUMENTS

| | | | |
|---|---|---|---|
| 3,827,649 | 8/1974 | Payen | 242/84.51 R |
| 4,527,753 | 7/1985 | Jones | 242/84.51 R |
| 4,553,714 | 11/1985 | Humble | 242/84.51 R |

Primary Examiner—Billy S. Taylor
Attorney, Agent, or Firm—Bacon & Thomas

[57] ABSTRACT

A fly-fishing reel comprising a stationary housing mounted on a fishing rod and a rotatable spool having a clicker gear engaged by a pivoted pawl which can apply resistance to the rotation of the spool with the aid of a pair of spring devices. A single knob on the exterior of the housing is provided with a connection with an adjustment device having two eccentric pins in contact connection with the spring devices. Rotating or moving the knob changes the relative positions of the spring devices with respect to the pawl, thus changing the resistance exerted on the spool and allowing fishermen to more easily sense the movement of a hooked fish.

1 Claim, 7 Drawing Figures

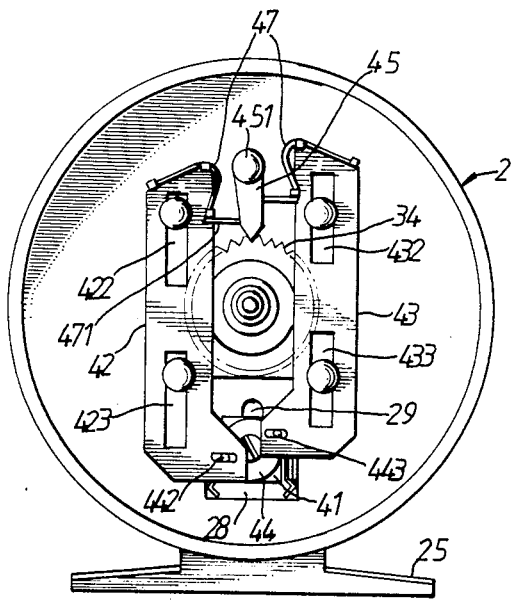

CLICKER-TYPE BRAKE FOR FLY-FISHING REEL

BACKGROUND OF THE INVENTION

Previously, there have been many devices disclosed to regulate the rotation of a line spool and the clicking sound thereof. One of these devices is disclosed in U.S. Pat. No. 4,527,753 (Jones) which shows a dual-control fly-fishing reel. The dual-control fly-fishing reel functions well but two drag knobs are needed to adjust the device. That is inconvenient for those fishermen standing in the water or in bad weather conditions. In order to overcome such a drawback, an improvement has been made on the dual-control fly-fishing reel and disclosed herein.

Other objects and merits and a fuller understanding of the invention will be obtained with reference to the attached drawings and the following description.

BRIEF DESCRIPTION OF THE DRAWINGS

FIG. 3, 4, 5, and 6 are plan views of the pawl and the adjustment means of the present invention, showing different operating positions.

DETAILED DESCRIPTION OF THE PREFERRED EMBODIMENT

Figure 1:
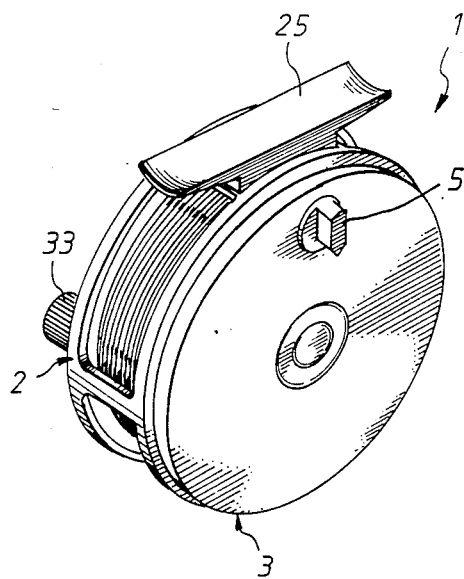
FIG. 1 is a perspective view of the present invention.
Figure 2:
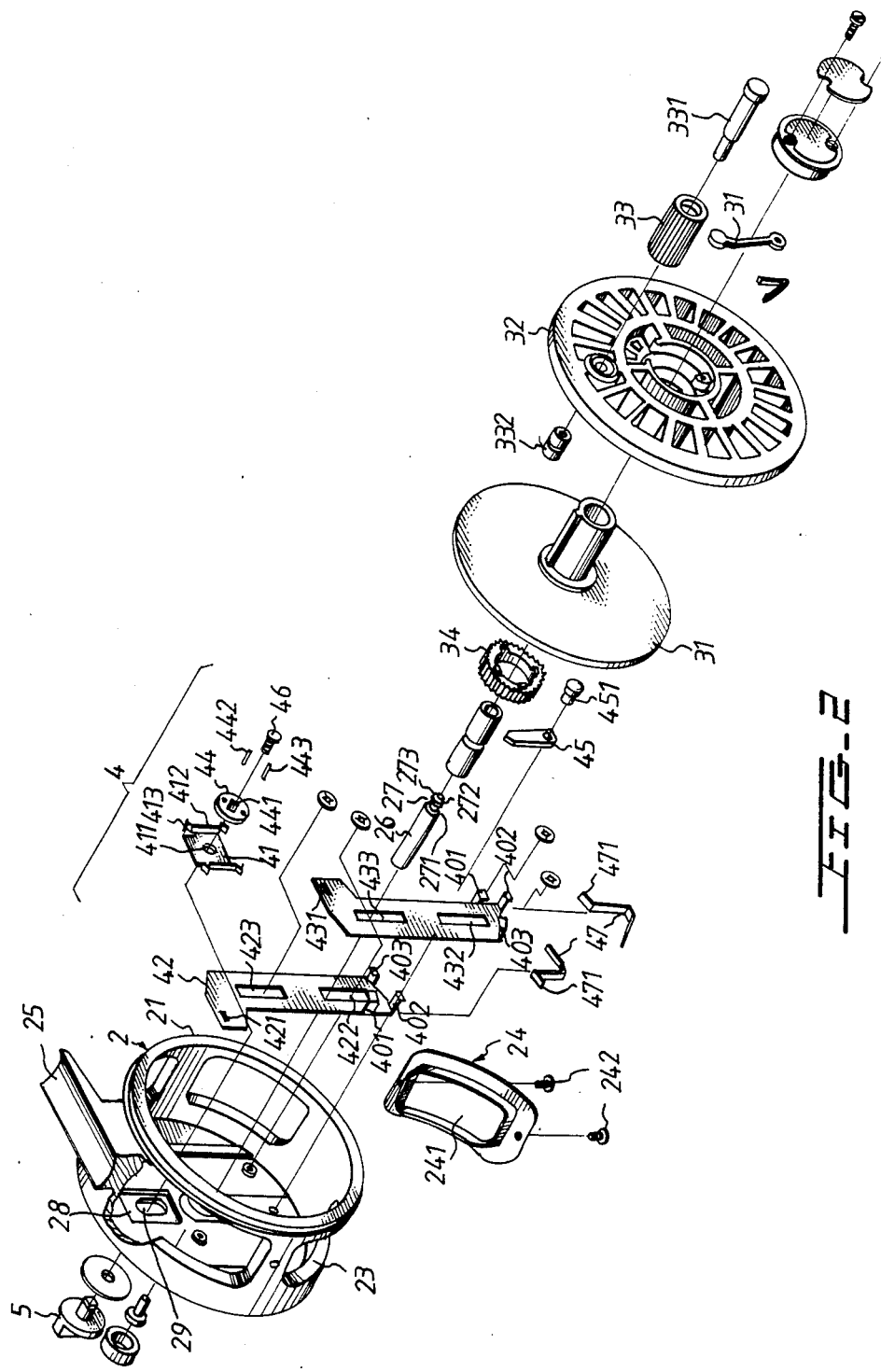
FIG. 2 is an exploded view of the present invention.

Referring to FIG. 1 and 2, it can be seen that fly-fishing reel 1 of the present invention comprises a housing 2, a spool 3 and adjustment means 4. The housing 2 is a hollow cylinder 21 with one end closed. A plurality of openings 23 are provided on the outer circumference of the cylinder 21. Mounted on each of the openings 23 is a cover 24 having transparent means 241 for showing the interior of the housing 2. These covers 24 may be mounted on the openings 23 by means of rivets or screws 242. A seat 25 is mounted on the place between an abitrary opening and the adjacent opening for mounting on a fishing rod (not shown). The housing 2 further has securely mounted therein at its axis a shaft 26, on which the spool 3 is rotatably mounted. Disposed proximately to the outer end of shaft 26 is a circumferential slot 27 which defines a neck 271 and a head 272. The neck 271 and head 272 cooperate with a stopper 31 to hold the spool after the spool 3 is put into the housing 2. The head 272 further has, starting from the end of the shaft 27, an enlarging tapered surface 273 which facilitates the assembling of the spool 3. Proximate to the seat 25, there is a rectangular recess 28 having a central elongated slot 29 which is in alignment with a radial line of the cylinder 21 and has circular ends. Two blockades 281 and 282 are disposed along each side parallel with the central axis of the slot 29. These blockades 281 and 282 are in resilient contact with a locking plate 41 to hold the plate 41 therein.

The spool 3 is constituted by an inner member 31, an outer member 32 and a handle means comprising a handle 33, a handle rivet 331 and a handle rivet sleeve 332. As this part of the invention does not differ from convention spools, no further details about the spool will be described herein. Mounted outside the inner member 31 of the spool 3 is a clicker gear 34 which is coaxial with the bearing opening in the spool 3. The gear 34 cooperates with a clicker pawl 45 which has a pointed inner end seating between adjacent teeth of the gear 34. The clicker pawl 45 is disposed in a direction normal to the clicker gear 34, extending from pivotal connection 451 of the housing 2.

Figure 7:
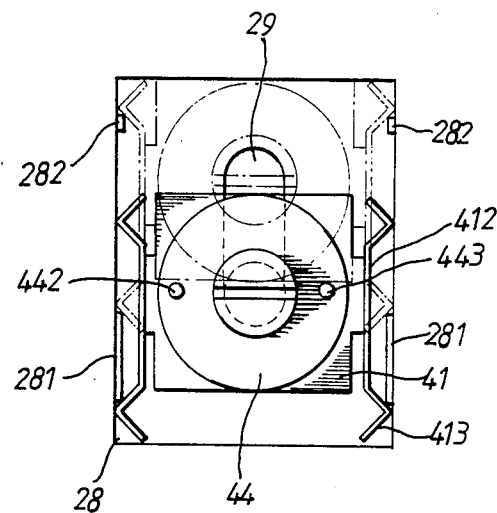
FIG. 7 is an enlarged plan view of the lock plate and the washer of the present invention.

The adjustment means 4 comprises the lock plate 41, a pair of sliding plate 42 and 43, and a washer 44. Referring to FIG. 2 and 7, it can be seen that the lock plate 41 is disposed on the recess 28 with a central hole 441 thereof matching the elongated slot 29. The washer 44 has two eccentrical and opposite pins 442 and 443 further disposed on the lock plate 41, a central rectangular hole 441 thereof matching the hole 441 of the lock plate 41. A bolt 46 securely screws on an axle 51 of a drag knob 5 which is disposed exteriorly to the closed end 22 of the hollow cylinder 21 with the axle 51 running through the elongated slot 29 and the holes 441 and 411. In the embodiment shown in the drawings, disposed on each of the two opposite sides of the lock plate 41 is a flange 412 with an outward ridge 413 on each end thereof. The lock plate 41 is disposed on the recess 28 so that the ridges 413 always contact and are held by the blockades 281 and 282, thus fixing the lock plate 41 and washer 44 at specific positions. Due to the flexibility of the flanges 412, when the exterior drag knob is pushed, the flanges 412 will deform slightly and the ridges 413 will be out of the grasp of the blockades, thus allowing the lock plate 41 and the washer 44 to move with the drag knob 5. The knob 5 can also rotate. Due to the engagement of the axle 51 of the knob 5 with the rectangular hole 441, when the knob 5 rotates, the washer 44 rotates correspondingly. Therefore, the movement of pins 442 and 443 can be linear and/or circular, depending on the movement of the knob 5.

Referring to FIGS. 3 to 6, it can be seen that the first and second sliding plates 42 and 43 are disposed on the interior of cylinder 21 so that they are mirror images about a plane passing through the axis of the elongated slot 29 and perpendicular to the side wall of the housing 2. For convenience, these first and second sliding plates will be referred to as the "left" and "right" sliding plates, respectively, as viewed in FIGS. 3-6. Each of the sliding plates 42 and 43 has two large slots (422, 423 and 432, 433, respectively) which are parallel to the axis of the elongated slot 29 and a small slot 421 or 431 disposed on one end of the sliding plates and perpendicular to the axis of the elongated slot 29. Each of the sliding plates 42 and 43 further has three hooking elements 401, 402 and 403 for holding a Z-shaped flat spring 47. Each of the flat springs 47 has a generally horizontally-extending end portion 471. The end portion 471 of the flat spring 47 in the left sliding plate 42 extends to the right, while the end portion 471 of the spring 47 in the right plate 43 extends to the left (i.e. the end portions extend toward each other). Pins 442 and 443 run through and are disposed within slots 421 and 431, respectively. The sliding plates 42 and 43 are guided by four rivets, two for each, which penetrate the slots 422, 423, 432, and 433 and are secured on the closed end 22 of the housing 2, so that when the knob 5 moves, the sliding plates will move correspondingly.

The sliding plates 42 and 43 are so disposed that the end portions 471 are in contact with the left and right sides of the pawl 45, respectively, for controlling the degree of resistance to the turning of clicker gear 34 and thus the spool 3. The end portion 471 of the spring 47 in the left sliding plate will contact the left side of the pawl 43 and exert a resistance to the leftward movement of the pawl 43, while the right end portion provides a resistance to the rightward movement of the pawl 43. Due to leverage, when the contact of the end portion with the pawl 45 is remote from the pivotal connection 451 of the pawl 45, the resistance exerted on the pawl 45 will be greater. Conversely, when the contact is near the pivot 451, the resistance is smaller. Thus, the degree of resistance to the turning of gear 34 is controlled by the positions of the sliding plates 42 and 43.

Figure 3:
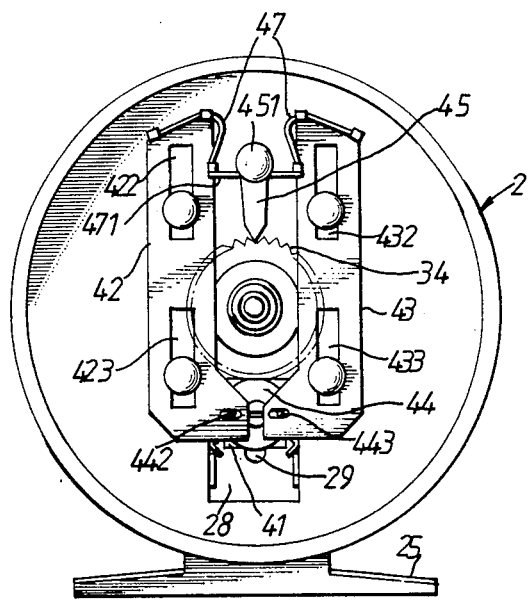

In FIG. 3, the drag knob 5, together with sliding plates 42 and 43, is in an extreme position where the end portions 471 is nearest the pivot 451 of the pawl 45 and, thus, the resistance to the movement of the pawl 45 (either leftward or rightward) will be smallest. When the spool 3 rotates, the tooth of gear 34 contacts pawl 45, thus urging the pawl 45 to move with the tooth. After a short distance, the pawl 45 will be out of engagement with the tooth and sprung back by one of the flat springs 47 to impact the next tooth and click once. When the spool 3 continues rotating, the gear 34 and the pawl 45 will keep on clicking. Since the resistance to movement of pawl 45 is small, the clicks will not be very noisy and the drag on fishing line (not shown) will be small.

Figure 4:
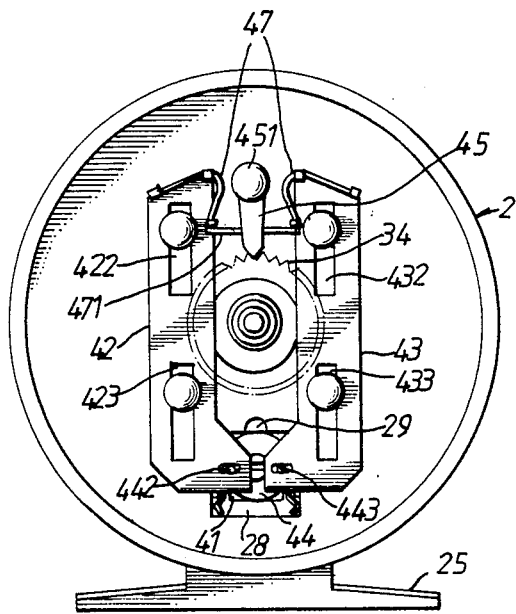

On the other hand, when the drag knob 5, together with the sliding plates 42 and 43, is in the opposite extreme position, most remote from the pivot 451, as shown on FIG. 4, the resistance to the movement of the pawl 45 (and thus the spool 3) will be largest. Therefore, in this position, the clicks will be loudest and the drag on the fishing line (not shown) is at a maximum.

FIGS. 5 and 6 show another two situations, wherein the drag knob 5 is in the same vertical position as in FIG. 4, but in a different rotary position. When knob 5 is turned, one of the sliding plates will move closely to the pivot 451 and the other away from the pivot 451, thus changing the resistance exerted on the pawl 45 by the flat springs 47. Therefore, the movement of the gear 34 in one direction will be more difficult than in the other direction. The clicks are also of different loudnesses.

Therefore, the fly-fishing reel in accordance with the present invention can be operated in four different conditions with only one drag knob.

I claim:

1. A fishing reel comprising a housing, a spool mounted rotatably in said housing, a clicker gear mounted securely and co-axially on said spool, a pawl pivotally disposed on said housing to engage with two adjacent teeth of said gear and adjustment means associated with said pawl, characterized in that said adjustment means comprises:

(A) a rectangular recess on said housing, an elongated slot further disposed within said recess with the axis thereof passing through the rotation axis of said spool, two pairs of blockades which are disposed along two sides of the recess in parallel with the axis of the elongated slot;
(B) a lock plate disposed on said recess with two flanges thereof parallel with said blockades and a central hole thereof matching said elongated slot, each of said flanges having a pair of ridges which are held by said blockades;
(C) a washer disposed on said lock plate with a central rectangular hole thereof matching the central hole of said lock plate, said washer having two opposing eccentrical pins;
(D) a drag knob disposed outside said housing with a axle running through said elongted slot, the central hole of the lock plate and the rectangular hole of the washer, the axle having a rectangular end which matches the rectangular hole of the washer, and a screw for fixing said knob, lock plate and washer together which fits into a threaded hole in the center of the rectangular end of the washer axle;
(E) two sliding plates disposed symmetrically with respect to a plane passing through the axis of the elongated slot and the rotation axis of the spool, each of the two sliding plates having a first slot perpendicular to said plane which fits on one of the washer pins, each sliding plate further having two second slots parallel with said plane, a pair of rivets passing through each of said second slots and being secured on the housing to guide the movement of said sliding plate, each plate further having three hooking means to receive a Z-shaped flat spring, said spring being associated with and in contact with said pawl to provide resistance to the movement of said pawl;

said fishing reel being further characterized in that said knob, together with said lock plate and washer, can slide back and forth along said elongated slot to extreme positions so as to change the relative position of said Z-shaped springs with respect to the pawl and thus the resistance thereof; and said fishing reel further having the property that said knob rotates the washer, the pins of the washer thus moving the sliding plates in opposite directions and changing the relative positions of said sliding plates with respect to said pawl, and changing the resistance therebetween.

* * * * *